US010832292B2

(12) United States Patent
Tierney

(10) Patent No.: US 10,832,292 B2
(45) Date of Patent: Nov. 10, 2020

(54) COLLABORATIVE GIVING SYSTEM AND METHOD

(71) Applicant: Doing Good Better, LLC, Dallas, TX (US)

(72) Inventor: Carl Christopher Tierney, Dallas, TX (US)

(73) Assignee: DOING GOOD BETTER, LLC, Dallas, TX (US)

( * ) Notice: Subject to any disclaimer, the term of this patent is extended or adjusted under 35 U.S.C. 154(b) by 321 days.

(21) Appl. No.: 16/125,333

(22) Filed: Sep. 7, 2018

(65) Prior Publication Data
US 2019/0012708 A1    Jan. 10, 2019

Related U.S. Application Data

(63) Continuation of application No. 13/965,988, filed on Aug. 13, 2013, now abandoned.

(60) Provisional application No. 61/682,437, filed on Aug. 13, 2012.

(51) Int. Cl.
*G06Q 30/02* (2012.01)
(52) U.S. Cl.
CPC ................ *G06Q 30/0279* (2013.01)
(58) Field of Classification Search
CPC .................................. G06Q 30/0279
USPC ......................................... 705/329
See application file for complete search history.

(56) References Cited

U.S. PATENT DOCUMENTS

| 2004/0111281 A1 | 6/2004 | Witter |
| 2005/0033669 A1 | 2/2005 | Stremler et al. |
| 2005/0256791 A1 | 11/2005 | Schaub |
| 2006/0122856 A1 | 6/2006 | Rushton et al. |

(Continued)

FOREIGN PATENT DOCUMENTS

WO    WO-2010097813 A1 *  9/2010  ............. G06Q 20/04

OTHER PUBLICATIONS https://www.nepa.gov.jm/projects/R2RW/R2RW%20CD%20-%2002/041/041.pdf, NPL A Buide to Fundraising and Proposal Writing, Author Reef Watershed Project. pp. 10 and 12-13. Jul. 28, 2004 (Year: 2004).*

*Primary Examiner* — Minnah L Seoh
*Assistant Examiner* — Debra L Glennie
(74) *Attorney, Agent, or Firm* — David W. Carstens; Carstens & Cahoon, LLP

(57) ABSTRACT

A collaborative giving system/method that coordinates the decimation and sharing of donor gifts within a cooperating group of donee recipients is disclosed. The system/method allows donee-specific donor databases to drive automated and spatially-distributed fundraising efforts for a collaborative project with donated funds being decimated and shared among collaborative donees while simultaneously guaranteeing that donor anonymity is maintained with respect to each individual donee-specific donor database. This donor/donee anonymity permits large groups of potentially diverse donors to be assembled to support collaborative projects while still maintaining donor privacy and donee autonomy. Within the context of this typical gifting application the disclosed system/method provides the necessary accounting interface and reports to ensure that the internal/external (Continued)

accounting/tax issues associated with the decimated gifting transaction are properly accounted for with the donor and all collaborating donees.

20 Claims, 8 Drawing Sheets

(56) References Cited

U.S. PATENT DOCUMENTS

| | | |
|---|---|---|
| 2007/0021973 A1 | 1/2007 | Stremler |
| 2008/0021720 A1* | 1/2008 | Glinberg ................ G06Q 40/12 |
| | | 705/30 |
| 2009/0192873 A1 | 7/2009 | Marble |
| 2009/0276345 A1 | 11/2009 | Hughes |
| 2010/0161465 A1 | 6/2010 | McMaster |
| 2011/0071907 A1 | 3/2011 | Lewis |
| 2011/0208822 A1 | 8/2011 | Rathod |

* cited by examiner

COLLABORATIVE GIVING SYSTEM AND METHOD

CROSS REFERENCE TO RELATED APPLICATIONS

This application is a continuation application of U.S. patent application Ser. No. 13/965,988, filed Aug. 13, 2013, which claims priority to U.S. Provisional Patent Application No. 61/682,437, filed Aug. 13, 2012, the entirety of which is incorporated herein by reference.

PARTIAL WAIVER OF COPYRIGHT

All of the material in this patent application is subject to copyright protection under the copyright laws of the United States and of other countries. As of the first effective filing date of the present application, this material is protected as unpublished material.

However, permission to copy this material is hereby granted to the extent that the copyright owner has no objection to the facsimile reproduction by anyone of the patent documentation or patent disclosure, as it appears in the United States Patent and Trademark Office patent file or records, but otherwise reserves all copyright rights whatsoever.

FIELD OF THE INVENTION

The present invention relates to systems and methods associated with computerized financial transactions. While not limitive of the teachings of the present invention, a typical application for this technology is in the field of donation management for non-profit organizations in situations where fundraising in support of a common collaborative project is desired.

PRIOR ART AND BACKGROUND OF THE INVENTION

Prior Art Context

A common scenario faced by many non-profit organizations is a desire to collaborate with other non-profit organizations to accomplish one or more goals associated with a collaborative project. For example, this might involve several church or other non-profit organizations collaborating to fund and construct a water treatment project in a foreign country as part of overall missionary activities in that country. In many circumstances an individual church would not have the financial resources to fund or support this activity individually, but by collaborating with other churches sufficient financial resources could be amassed to successfully fund and implement the collaborative water treatment project.

Typically in these scenarios each individual non-profit entity would have difficulty in generating a collaborative fundraising effort to support this collaborative project for several reasons. First, the donor base of each individual church would not be sufficient to solicit donations to support the project. Second, sharing of donor databases so that other churches could solicit their members would violate donor privacy and also infringe on the autonomy of an individual church. Third, coordination and proper dissemination of the funds collected from the donation efforts is far beyond the infrastructure capabilities of most church organizations.

As a result, collaborative giving in this context is generally limited because each individual church or non-profit lacks any methodology of solving these problems while still accomplishing the overall task of collecting and disseminating donations in support of the collaborative project.

Deficiencies in the Prior Art

The prior art as detailed above suffers from the following deficiencies:
  Donation methodologies for collaborative giving do not protect donor privacy.
  Donation methodologies for collaborative giving do not protect donee autonomy
  Donation methodologies for collaborative giving generally lack proper accounting/tax reporting capabilities for both the donor and donee.
  Donation methodologies for collaborative giving generally lack automated dissemination procedures to fracture a given donation and distribute it among a number of donees.

While some of the prior art may teach some solutions to several of these problems, the core issues of integrating donation capabilities among a variety of donees in support of a collaborative project has not been addressed by the prior art.

OBJECTIVES OF THE INVENTION

Accordingly, the objectives of the present invention are (among others) to circumvent the deficiencies in the prior art and affect the following objectives:
  (1) Provide for a collaborative giving system and method that protects donor privacy.
  (2) Provide for a collaborative giving system and method that protects donee autonomy.
  (3) Provide for a collaborative giving system and method that provides backend accounting/tax reporting capabilities for donors and donees.
  (4) Provide for a collaborative giving system and method that allows automatic dissemination of donations among a number of donees in support of one or more collaborative projects.

While these objectives should not be understood to limit the teachings of the present invention, in general these objectives are achieved in part or in whole by the disclosed invention that is discussed in the following sections. One skilled in the art will no doubt be able to select aspects of the present invention as disclosed to affect any combination of the objectives described above.

BRIEF SUMMARY OF THE INVENTION

The present invention describes a system and method for facilitating donor contributions in support of a collaborative project sponsored by one or more donees. The system/method permits a donor via the use of a graphical user interface (GUI) to access a collaborative giving processor (CGP) through a computer network. The CGP processes the donor gift using a computerized transaction processor and then disseminates/fractures this donation for payment to one or more donees for use towards a collaborative project. Each donee may independently maintain their donor database and be assured that this information is kept private, thus assuring individual donor privacy and donee autonomy as to individual donor-donee relationships.

In addition to processing the computerized financial transaction associated with the donation, the CGP generates reports for the donor and donees to ensure that proper accounting/tax reporting is provided for all parties to the donation transaction. The use of "triggered" gifting based on donor-defined conditions may also be integrated into some preferred embodiments of the present invention.

BRIEF DESCRIPTION OF THE DRAWINGS

For a fuller understanding of the advantages provided by the invention, reference should be made to the following detailed description together with the accompanying drawings wherein.

DESCRIPTION OF THE PRESENTLY PREFERRED EXEMPLARY EMBODIMENTS

Figure 1:
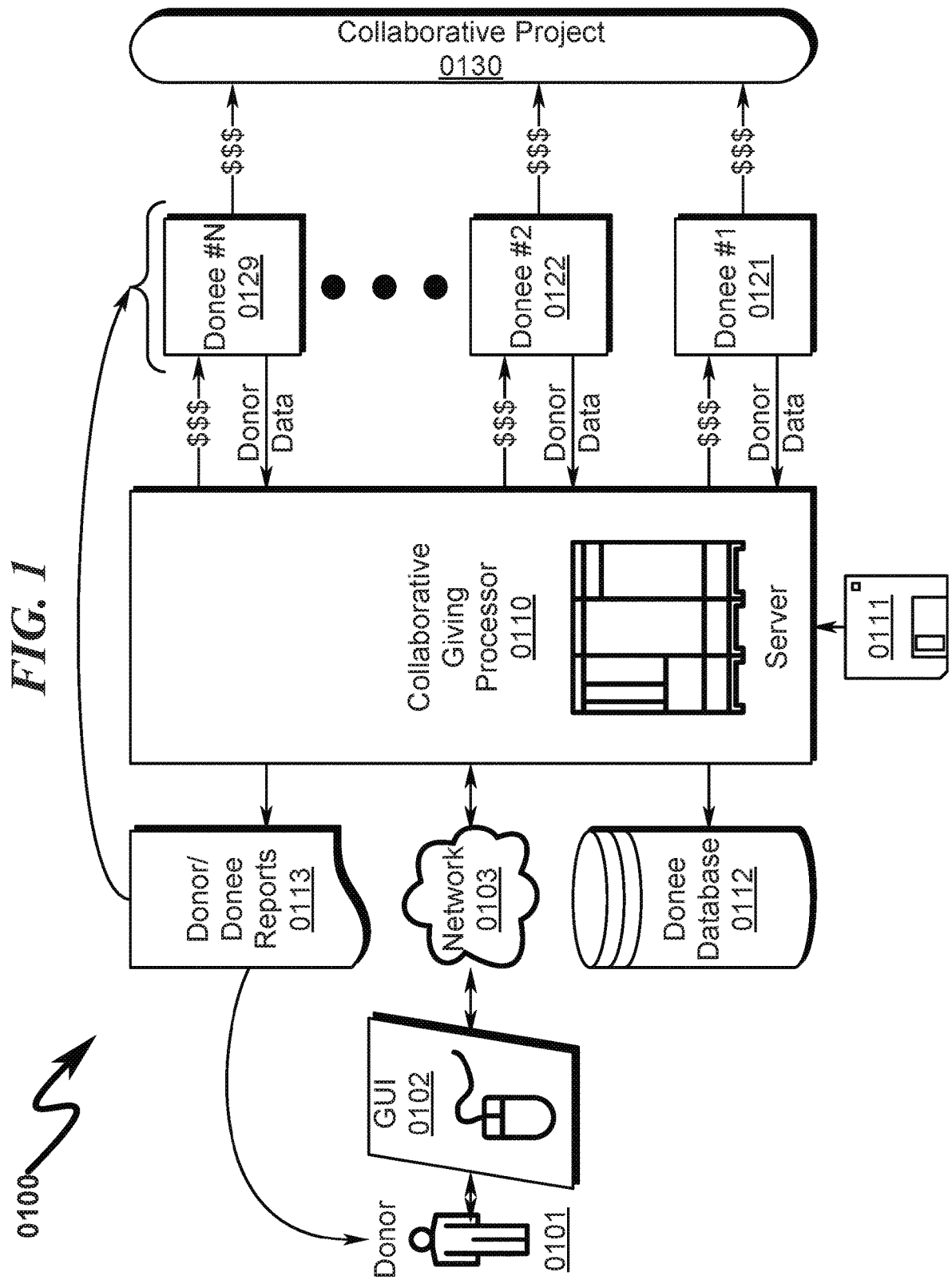
FIG. 1 illustrates a preferred exemplary system embodiment of the present invention.

While this invention is susceptible of embodiment in many different forms, there is shown in the drawings and will herein be described in detailed preferred embodiment of the invention with the understanding that the present disclosure is to be considered as an exemplification of the principles of the invention and is not intended to limit the broad aspect of the invention to the embodiment illustrated.

The numerous innovative teachings of the present application will be described with particular reference to the presently preferred embodiment, wherein these innovative teachings are advantageously applied to the particular problems of a COLLABORATIVE GIVING SYSTEM AND METHOD. However, it should be understood that this embodiment is only one example of the many advantageous uses of the innovative teachings herein. In general, statements made in the specification of the present application do not necessarily limit any of the various claimed inventions. Moreover, some statements may apply to some inventive features but not to others.

Internet Communication Not Limitive

The present invention anticipates that a wide range of communication methodologies may be utilized to affect a specific implementation of the present invention. While the present invention specifically anticipates that the use of the Internet for most applications, the present invention makes no limitation on the type of communication technology or computer networking that may be used. Thus, the term "computer network" and/or "Internet" are to be given the broadest possible definitions within the scope of the present invention.

Trustee/Primary Donee not Limitive

The present invention anticipates that in many circumstances the monetary contribution from a donor will be initially directed to a "primary donee" that has a relationship with the donor and then disseminated/fractured for distribution to "secondary donees" that may or may not be known to the donor. This paradigm may be modified in some embodiments to incorporate a third party "trustee donee" that replaces the primary donee for purposes of the initial donor finds transfer. Thus, in this case the trustee donee receives the funds from the donor (via a computerized transaction) and then these funds are disseminated/fractured for distribution to the primary donee and/or secondary donees as dictated by agreements between the primary and secondary donees in conjunction with donation restrictions that may be placed on the donation by the donor and/or primary donee.

Monetary Dissemination/Fracturing not Limitive

The present invention may equivalently use the terms "dissemination" and "fracturing" to describe the fractional distribution of monetary funds from a donor to one or more donees. This distribution methodology should be given its broadest possible interpretation, and assumes that in some circumstances some donees may not receive any portion of the monetary funds, or in some circumstances the donees may solicit funding for a collaborative project but act merely as a conduit for funds transfer to the collaborative project. Yet other scenarios may permit cooperating donee organizations to solicit from their known bases of donors and have the collected funds transferred to third party donees that are unknown to the original donors. In all of these processes, it is anticipated that the identification of the donors may be kept confidential with respect to an individual soliciting donee based on privacy profiles maintained by individual donee organizations.

Collaborative Project not Limitive

The present invention describes the "terminal donee" for a monetary contribution (or portion thereof) in terms of a "collaborative project." This term should be given its broadest possible meaning and in this context can be any organization/entity/individual to which funding is desired to be targeted. For example, several churches could collaborate to support an overseas missionary and his/her family, a local individual needing medical care, a local food bank, hospital, etc. The present invention makes no limitation on the scope of this term within this context.

Account Restrictions/Allocations not Limitive

The present invention anticipates that in some circumstances donations from an individual donor may be "tagged" with account restrictions that limit the application scope to which the donated funds may apply. Thus donation account restrictions may apply to any particular donor contribution and the account restriction "tags" remain associated with the donor contribution as it is processed by the CGP described herein and eventually distributed to a terminal donee for use on one or more collaborative projects. The term "restricted account transaction" will be used herein to denote a financial transaction in which the computerized transaction incorporates limitations on the terminal use of the funds transfer.

System Overview (0100)

The present invention in a system embodiment may be broadly described as depicted in FIG. 1 (0100) wherein the system application context deals with a donor (0101) giving/gifting system using a graphical user interface (GUI) (0102) interacting over a communications network (0103) (typically the Internet). Within this context a collaborative giving processor (0110) executing software read from a computer readable medium (0111) communicates with the GUI (0103) to affect monetary funds transfers to any number of donees (0121, 0122, 0129) that are associated with a common collaborative project (0130) based on donation distribution information contained in a donee database (0112). Reports (0113) of the completed giving transaction and/or accounting ledgers are generated by the collaborative giving processor (0110) and distributed electronically to both the donor (0101) and donees (0121, 0122, 0129).

Collaborative giving in this context is enhanced by virtue of the fact that each of the donees (0121, 0122, 0129) may have their own donor databases that are accessed by the collaborative giving processor (0110) to identify and solicit potential donors (0101). These donor databases are generally proprietary to each donee (0121, 0122, 0129) and are not shared among the donees (0121, 0122, 0129). However, in this context the donor information is not shared but rather used to coordinate the disseminated distribution of gifts from the donor (0101) to the various donees (0121, 0122, 0129) for the purposes of supporting a collaborative project (0130) that is commonly operated by the donees (0121, 0122, 0129).

As an exemplary application, the system as depicted might be used in a situation where a number of church organizations as donees (0121, 0122, 0129) wish to collaborate on a water treatment plant in a foreign mission as a collaborative project (0130). Within this example, donors (0101) associated with any number of the donees (0121, 0122, 0129) may be solicited electronically via the collaborative giving processor (0110) over the communications network (0103) for contributions to the collaborative project (0130) in the name of their particular donee church organization (0121, 0122, 0129). The collaborative giving processor (0110) accepts the donations, processes the financial transactions associated with these donations, and distributes the monetary funds among the donee church organizations (0121, 0122, 0129) based on financial agreements between the donee church organizations (0121, 0122, 0129) as to how the donor (0101) donation is to be distributed.

As seen from this example, the system permits donations from a wide variety of donor sources (0101) to be accepted and shared among a wide variety of donees (0121, 0122, 0129) for the purposes of supporting a common project goal (0130) without compromising the privacy of an individual donor (0101) or restricting the autonomy of each donee (0121, 0122, 0129).

Note that this contribution model also anticipates scenarios where donors (0101) are solicited by a number of donees (0121, 0122, 0129) in a coordinated manner with the donations provided by the donors (0101) being forwarded directly to a funding pool associated with the collaborative project (0130), thus bypassing any accounting or funds management associated with the donees (0121, 0122, 0129).

Method Overview (0200)

Figure 2:
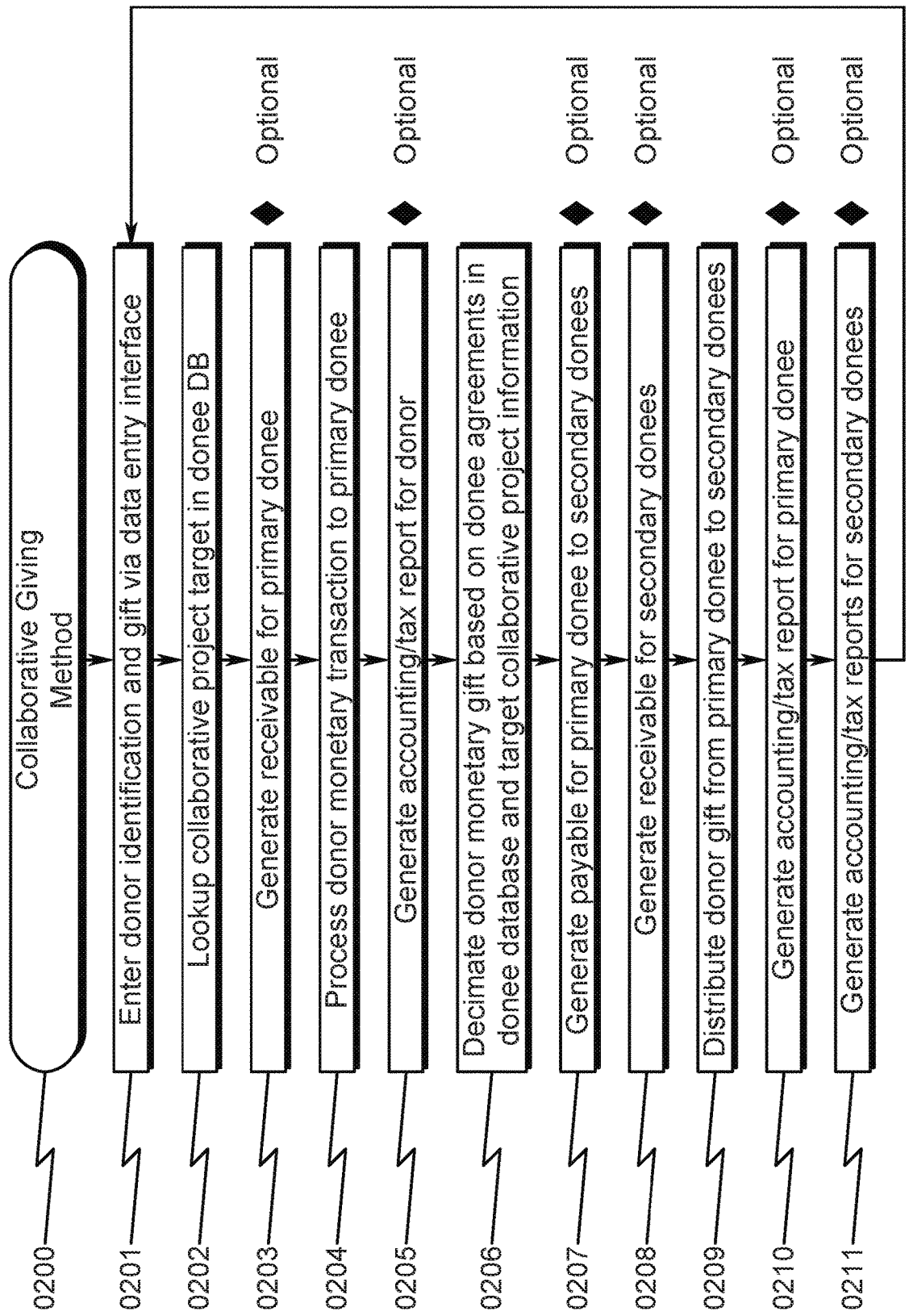
FIG. 2 illustrates a preferred exemplary method embodiment of the present invention.

The present invention in a method embodiment may be generally described by the flowchart of FIG. 2 (0200), wherein the collaborative giving method comprises the following steps:

(1) accepting entry of identification (donor ID and primary donee ID) and donee gift information (donation amount and donee collaborative project ID) via a data entry interface (0201);
(2) indexing the collaborative project ID) in a donee database to determine the donee targets associated with the collaborative project ID (0202);
(3) generating a receivable for the primary donee (0203);
(4) processing the donor monetary transaction to the primary donee (0204);
(5) generating accounting/tax reports for the donor for the completed donor monetary transaction (0205);
(6) disseminating the donor monetary gift to the primary donee based on donee agreements and target collaborative project information contained within a donee database (0206);
(7) generating a payable for the primary donee to the secondary donees based on the dissemination of step (6) (0207);
(8) generating a receivable for the secondary donees based on the dissemination of step (6) (0208);
(9) distributing said gifting target fractured amount from the primary donee to the secondary donees based on the dissemination of step (6) (0209);
(10) generating accounting/tax reports for the primary donee for the distribution (0210);
(11) generating accounting/tax reports for the secondary donees for the distribution (0211); and
(12) proceeding to step (1);
wherein
the steps are performed by one or more computer systems executing software retrieved from a computer readable medium.

This general method may be modified heavily depending on a number of factors, with rearrangement and/or addition/deletion of steps anticipated by the scope of the present invention. Integration of this and other preferred exemplary embodiment methods in conjunction with a variety of preferred exemplary embodiment systems described herein is anticipated by the overall scope of the present invention.

Note that within this exemplary method embodiment one preferred alternative makes one or more of the steps (0203, 0205, 0207, 0208, 0210, 0211) optional. Yet another method variant replaces the primary donee with a trustee donee (trusted financial intermediary) and combines the primary donee and secondary donees into a group termed "terminal donees" that are then used as targets for financial distributions based on the dissemination step (0206).

Privacy/Autonomy Preservation Architecture (0300, 0400)

One feature of the present invention is maintenance of donor privacy while simultaneously preserving donee autonomy. In many circumstances cooperating donees do not wish to share their donor lists and the information regarding donors is generally treated as private confidential information that is not shared with third parties. Similarly, each donee generally wishes to maintain their own autonomy with respect to other donees and not be subject to the policies and procedures associated with other donees. This desire for donee autonomy is also reflected in the fact that the financial processing systems associated with each donee are generally different and incompatible.

Figure 3:
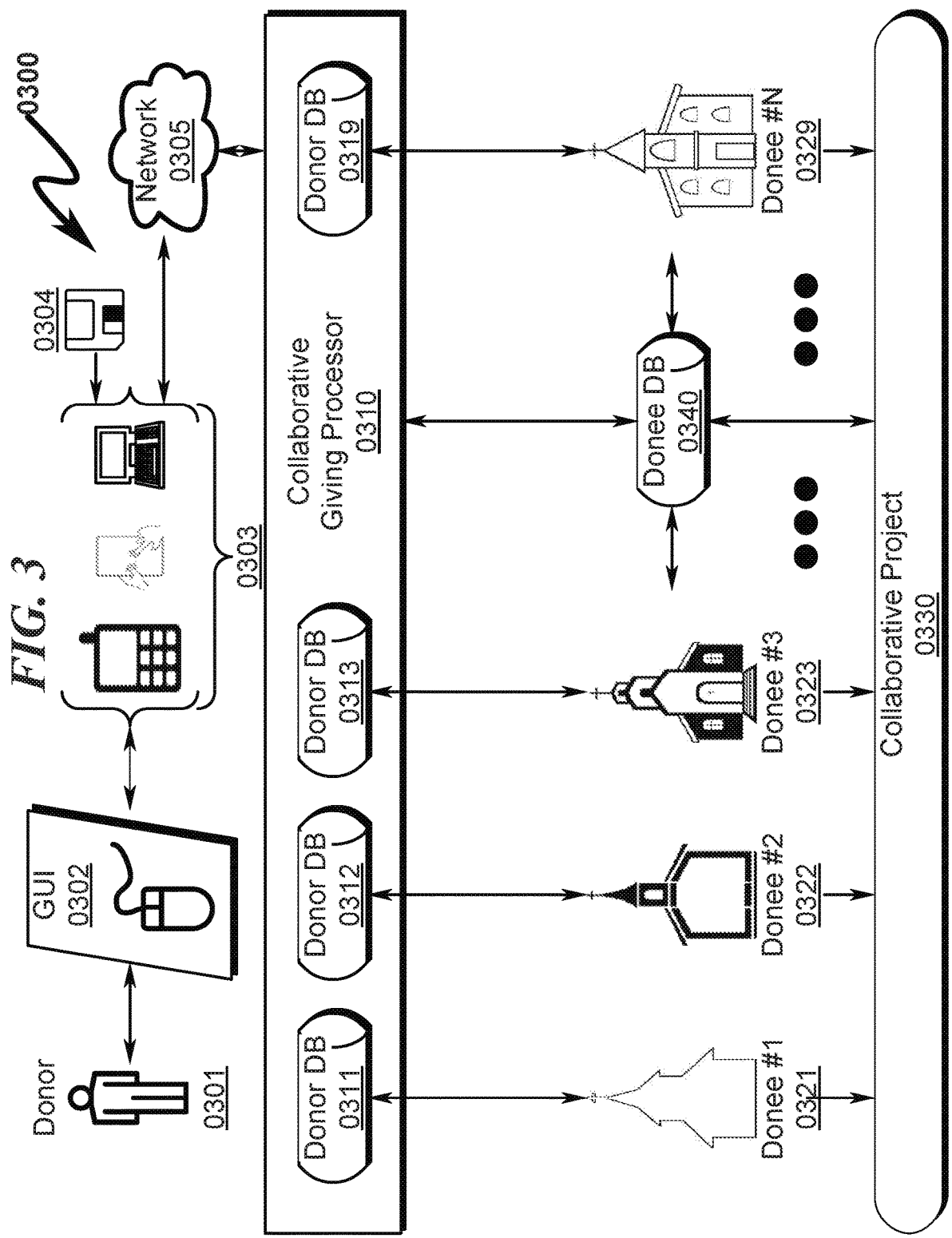
FIG. 3 illustrates a preferred exemplary system embodiment of the present invention depicting privacy/autonomy protection using integrated donor databases.

This need for privacy/autonomy may be addressed as described in FIG. 3 (0300), wherein an exemplary invention embodiment depicts a donor (0301) interacting via a GUI (0302) with a data entry interface (0303) that executes machine instructions read from a computer readable medium (0304). This GUI hardware/software interface communicates via a computer network to a collaborative giving processor (CGP) (0310) that interacts with a number of separate and independent donor databases (0311, 0312, 0313, 0319) that are associated with individual donee organizations (0321, 0322, 0323, 0329) that support a common collaborative project (0330).

A donee database (0340) maintains information on each donee organization (0321, 0322, 0323, 0329) and the common collaborative project (0330) that each supports. Multiple common collaborative projects (0330) are anticipated to be supported within this framework, as well as disparate groupings of donee organizations (0321, 0322, 0323, 0329). Since each donor databases (0311, 0312, 0313, 0319) is isolated based on the associated donee organization (0321, 0322, 0323, 0329), donor privacy is maintained and donee autonomy with respect to their donor base is maintained.

Figure 4:
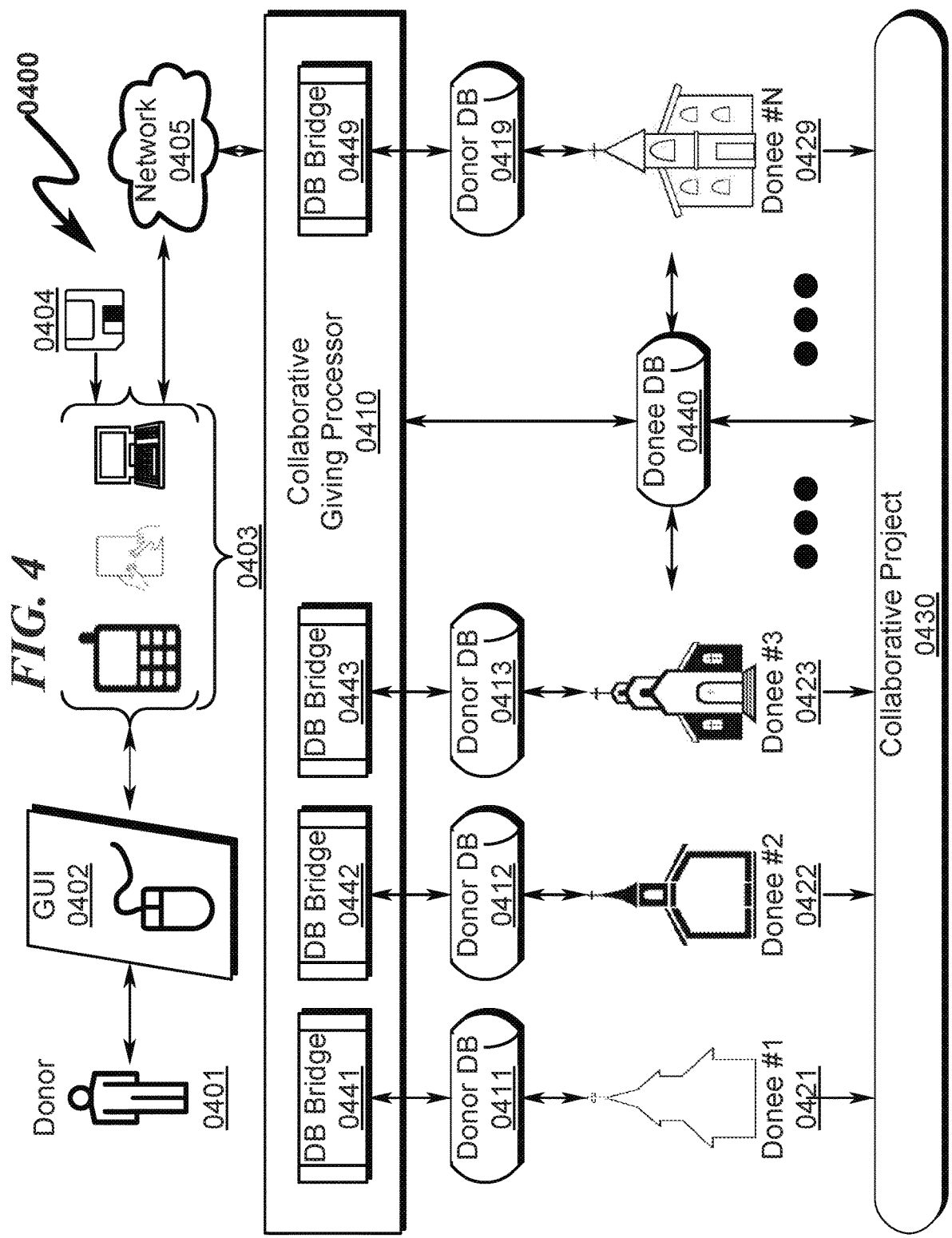
FIG. 4 illustrates a preferred exemplary system embodiment of the present invention depicting privacy/autonomy protection using donee-controlled donor databases.

Note that while FIG. 3 (0300) indicates that the donor databases (0311, 0312, 0313, 0319) may be present within the CGP (0310), other implementations of the present invention as generally illustrated in FIG. 4 (0400) may utilize a database "bridge" (0441, 0442, 0443, 0449) between the CGP (0410) and databases local to each donee organization (0421, 0422, 0423, 0429). One skilled in the art will recognize that the donor database (0421, 0422, 0423, 0429) bridges (0441, 0442, 0443, 0449) may take many forms and are application specific to the donation/accounting software used by each individual donee organization (0421, 0422, 0423, 0429).

Accounting/Tax Ledger Reconciliation/Reporting (0500)

Figure 5:
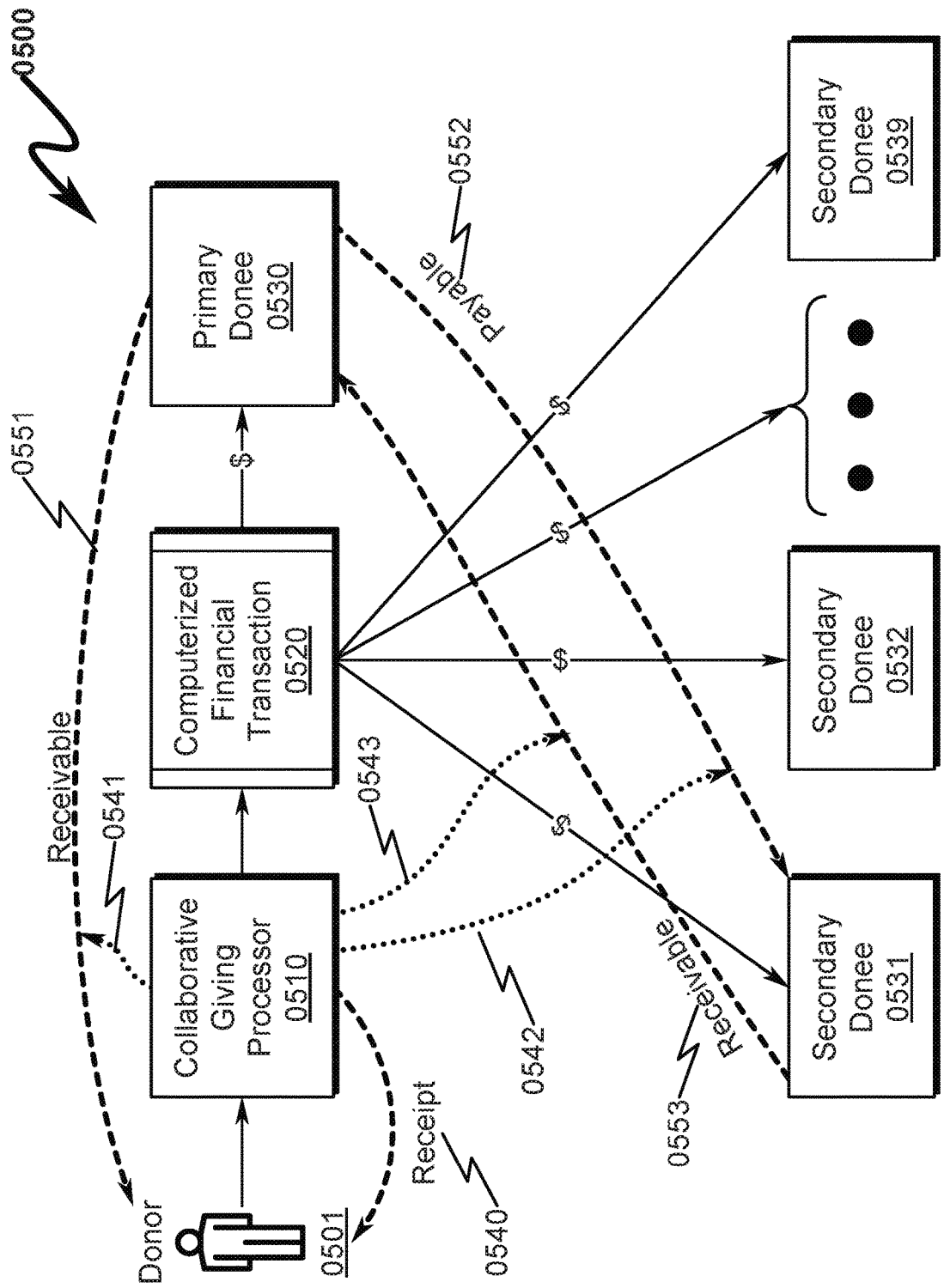
FIG. 5 illustrates a preferred exemplary system embodiment of the present invention depicting accounting/tax and reporting capabilities present in some invention embodiments.

The present invention anticipates that in conjunction with computerized financial transactions a number of accounting/tax ledger reconciliation and/or reporting capabilities may be incorporated into various invention embodiments. As generally illustrated in FIG. 5 (0500), a donor (0501) may interact with a collaborative giving processor (0510) to trigger computerized financial transactions (0520) to a primary donee (0530) that is known by the donor (0501) as well as secondary donees (0531, 0532, 0539) that have no connection to or knowledge of the donor (0501). The computerized financial transactions (0520) generally disseminate the financial gift of the donor (0501) into gifting target (donee) fractured amounts based on a donee database maintained by the collaborative giving processor (0510).

In conjunction with triggering financial transaction processing (0520) functions, the collaborative giving processor (0510) may inform (0541) the primary donee (0530) of a receivable (0551) due from the donor (0501) Similarly, the primary donee (0530) may be informed (0542) of a required payable (0552) due to the secondary donees (0531, 0532, 0539) and the secondary donees (0531, 0532, 0539) may be informed (0543) of a receivable (0553) due from the primary donee (0530). Finally, for tax accounting purposes, the donor (0501) may be provided with a tax receipt (0540) or other information documenting the charitable gift to the primary donor (0530) and the secondary donees (0531, 0532, 0539).

Trustee Account Management (0600)

Figure 6:
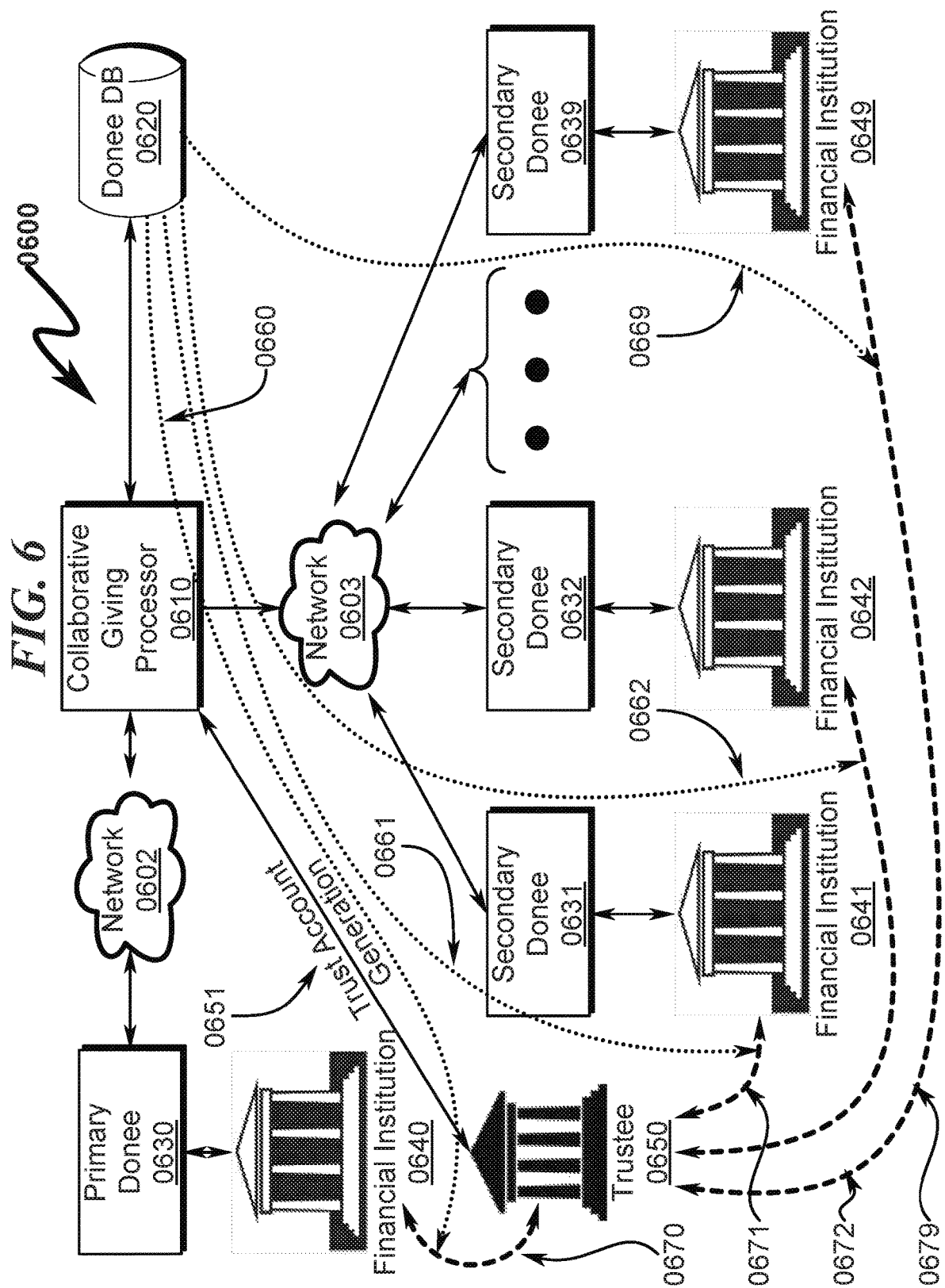
FIG. 6 illustrates a preferred exemplary embodiment of the present invention that utilizes an intermediate trustee donor to manage financial transactions to primary/secondary donees.

The present invention may incorporate a wide variety of methodologies by which the collaborative giving processor (CGP) distributes the disseminated monetary donation of the donor to the various primary and secondary donees. One exemplary architecture that may be used by many preferred embodiments is generally illustrated in FIG. 6 (0600) wherein the collaborative giving processor (0610) utilizes a donee database (0620) that describes the target collaborative project and participating donee organizations, which may comprise a primary donee (0630) and any number of secondary donees (0631, 0632, 0639). Each of these donee organizations (0630, 0631, 0632, 0639) may have an associated financial institution (0640, 0641, 0642, 0649) that handles their financial matters, banking accounts, etc.

In one preferred invention embodiment a trustee financial institution (0650) manages a trust account (0651) that is created by the CGP (0610) to act as a conduit for funds from a variety of donees that target a particular collaborative project. The donee database (0620) provides financial institution accounting information so that the CGP may utilize information in the donee database (0620) to trigger (0660, 0661, 0662, 0669) funds transfers (0670, 0671, 0672, 0679) from the trustee financial institution (0650) to the various donee financial institutions financial institution (0640, 0641, 0642, 0649) based on a dissemination fracturing of the monetary donation that was initially deposited in the trustee financial institution by the donor.

Distribution Restriction Rules Application (0700)

Figure 7:
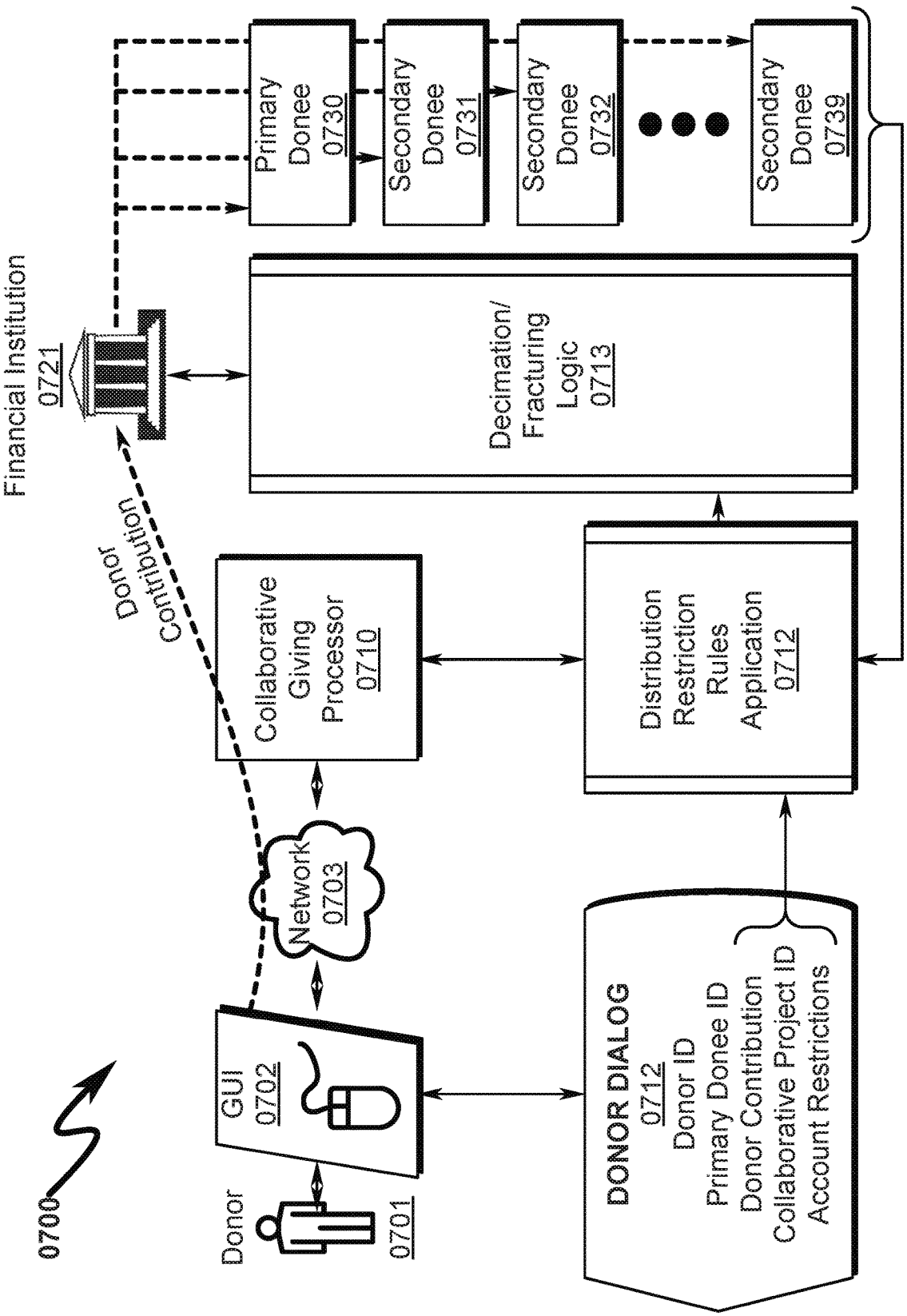
FIG. 7 illustrates a preferred exemplary embodiment of the present invention that integrates accounting restrictions that limit how donor contributions may be distributed to target donees.

The present invention in some preferred embodiments may incorporate a variety of distribution restriction rules that limit how donor contributions may be distributed to target donees. As generally illustrated in FIG. 7 (0700), an individual donor (0701) interacting with a GUI (0702) through a computer network (0703) to a typical collaborative giving processor (CGP) (0710) may be presented with a donor dialog (0711) via a data entry interface (DEI) that prompts for a donor ID, primary donee ID, donor contribution (monetary amount), collaborative project ID, and/or account restrictions. The account restrictions portion of this typical dialog may present boundaries and conditions on which the donor contribution is to be applied to either the collaborative project ID and/or the primary donor.

For example, the donor may restrict the donation to "only apply to meals for the elderly in county X" as part of a "meals on wheels" collaborative project ID. One skilled in the art will recognize that the list of conditionals associated with these distribution restrictions is application specific and thus extremely broad in application scope.

These donor distribution restrictions are then used as input to a distribution restriction rules application process (0712) that operates within the context of the CGP (0710) to drive the dissemination/fracturing logic (0713) that interacts with the financial institution (0721) to affect payment to the target donees (0730, 0731, 0732, 0739). As indicated in the diagram, the target donees (0730, 0731, 0732, 0739) may also impose restrictions on the distribution of the donor contribution and these restrictions may be used by the rules application process (0713) to restrict operation of the dissemination/fracturing logic (0713) and thus dictate the flow of money from the financial institution to the various target donees (0730, 0731, 0732, 0739).

Collaboration Invitations (0800)

Figure 8:
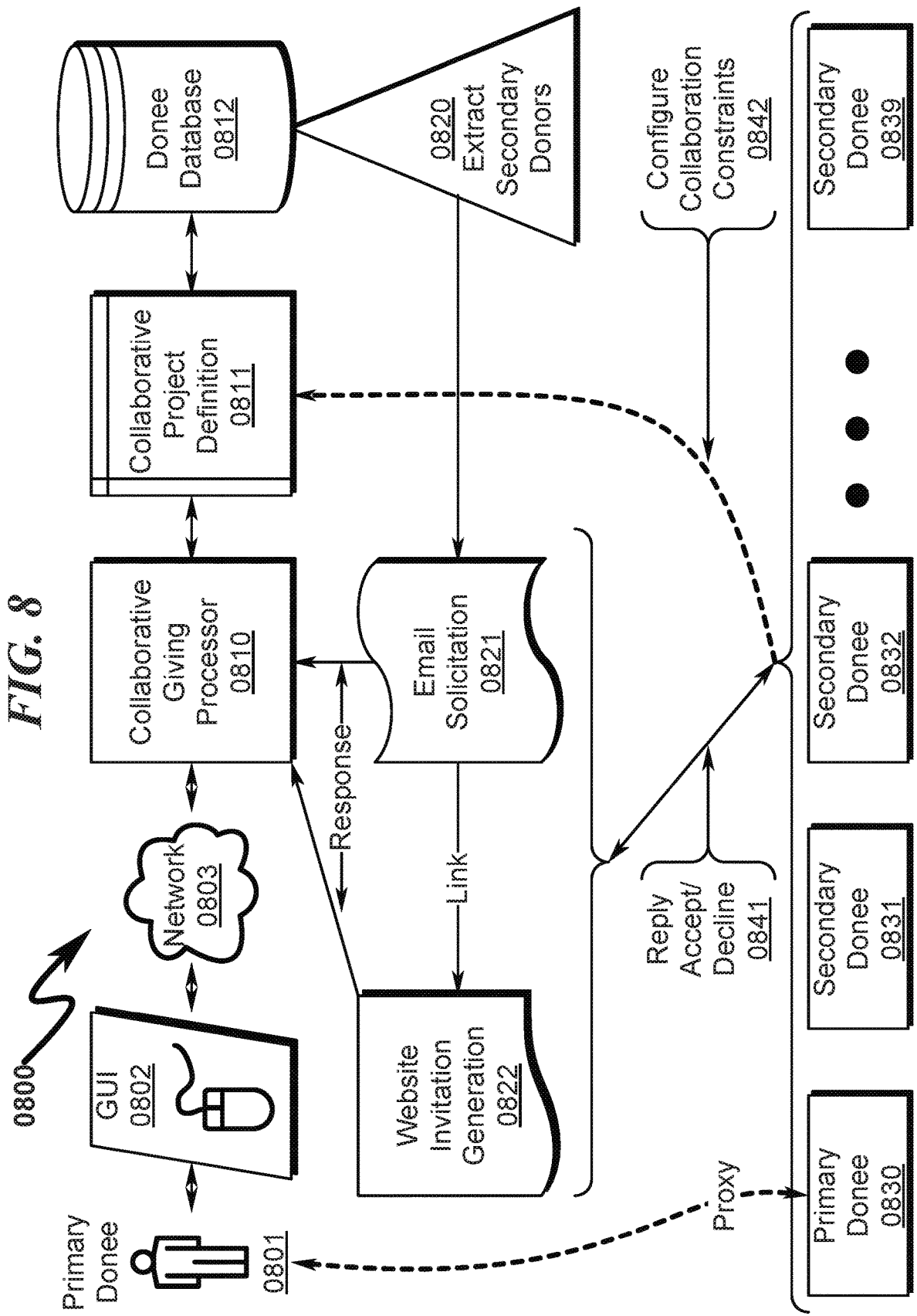
FIG. 8 illustrates a preferred exemplary embodiment of the present invention that implements donee solicitation to affect collaborative giving.

The present invention anticipates that the collaborative giving processor (CGP) described herein may in some preferred embodiments incorporate a mechanism whereby "primary" donees may solicit "secondary" donees to collaborate in a collaborative giving project. As generally illustrated in FIG. 8 (0800), this collaborative giving architecture begins with a primary donee operator (0801) acting as a proxy for a primary donee (0830) interacting with a graphical user interface (0802) over a computer network (0803) with a collaborative giving processor (CGP) (0810) to define a collaborative project definition (0811) that defines the collaborative project and prospective donee participants. This collaborative project definition is typically stored in a donee database (0812) that contains information on potential donees that may wish to participate in the collaborative project.

The donee database (0812) is used as a source for potential secondary donee information that is extracted (0820) from the database (0812) to automatically generate email (0821) and/or website collaboration invitation information (0822) that is then distributed to a list of potential target donees (0830, 0831, 0832, 0839) that may wish to participate in the collaborative project. This collaboration invitation information (0821, 0822) may incorporate a wide variety of materials and media that are not limited strictly to email/website generation, such as text messages, video, voicemail, etc. Each of the potential target donees (0830, 0831, 0832, 0839) may reply (0841) to the CGP (0810) either accepting or declining the invitation to participate in the collaborative project. In addition to initiating a reply (0841), the target donees (0830, 0831, 0832, 0839) may initiate a dialog with the CGP (0810) to configure collaboration constraints (0842) on the nature of their collaboration, restrictions on how collected funds will be used and/or distributed, and other constraints governing their participation in the collaboration project.

This generalized collaboration project solicitation architecture permits individual target donees (0830, 0831, 0832, 0839) to cooperate in generating financing for collaborative projects while still maintaining privacy of their own donor databases and also maintaining autonomy as far as how policies and procedures within their organization are implemented as they relate to fundraising, funds distribution, accounting, and the like.

System Summary

The present invention system anticipates a wide variety of variations in the basic theme of construction, but can be generalized as a collaborative giving system comprising:
 (a) data entry interface (DEI);
 (b) collaborative giving processor (CGP);
 (c) donor database (DOD); and
 (d) donee database (DED);
 wherein
 the DEI displays a donation dialog screen, the donation dialog screen comprising data entry fields to be completed by donor input to the DEI;
 the data entry fields are used by the CGP to index into the DOD to retrieve a donor data record;
 the data entry fields are used by the CGP to identify a collaborative gifting project and a monetary gifting amount;
 the DED is indexed by the gifting project to determine gifting targets for the monetary gifting amount;
 the monetary gifting amount is fractured among the gifting targets according to information contained in the DED to define a gifting target fractured amount specific to each of the gifting targets;
 the CGP initiates a computerized donor transaction to receive the monetary gifting amount from the donor using information contained in the donor data record; and
 the CGP initiates a computerized donee transaction to transfer the gifting target fractured amount to each of the gifting targets.

This general system summary may be augmented by the various elements described herein to produce a wide variety of invention embodiments consistent with this overall design description.

Method Summary

The present invention method anticipates a wide variety of variations in the basic theme of implementation, but can be generalized as a collaborative giving method comprising:
 (1) accepting entry of identification (donor ID and primary donee ID) and donee gift information (donor contribution and donee collaborative project ID) via a data entry interface (DEI);
 (2) using a collaborative giving processor (CGP), indexing the collaborative project ID in a donee database to determine the donee targets associated with the collaborative project ID;
 (3) using a collaborative giving processor (CGP), processing the donor contribution to the primary donee via a computerized donor transaction;
 (4) using a collaborative giving processor (CGP), disseminating the donor contribution to the primary donee to generate a gifting target fractured amount based on information contained within the donee database;
 (5) using a collaborative giving processor (CGP), distributing the gifting target fractured amount from the primary donee to the target donees based on the dissemination of step (4) via a computerized donee transaction; and
 (6) proceeding to step (1);
 wherein
 the steps are performed by one or more computer systems executing software retrieved from a computer readable medium.

This general method may be modified heavily depending on a number of factors, with rearrangement and/or addition/deletion of steps anticipated by the scope of the present invention. Integration of this and other preferred exemplary embodiment methods in conjunction with a variety of preferred exemplary embodiment systems described herein is anticipated by the overall scope of the present invention.

Alternate Method Summary

A present invention alternative embodiment method anticipates a wide variety of variations in the basic theme of implementation, but can be generalized as a collaborative giving method comprising:

(1) accepting entry of identification (donor ID and primary donee ID) and donee gift information (donor contribution and donee collaborative project ID) via a data entry interface (DEI);
(2) using a collaborative giving processor (CGP), indexing the collaborative project ID in a donee database to determine the donee targets associated with the collaborative project ID;
(3) generating a receivable for the primary donee associated with the donor;
(4) using a collaborative giving processor (CGP), processing the donor contribution to the primary donee via a computerized donor transaction;
(5) generating accounting/tax reports for the donor associated with the processing;
(6) using a collaborative giving processor (CGP), disseminating the donor contribution to the primary donee to generate a gifting target fractured amount based on information contained within the donee database;
(7) generating a payable for the primary donee to the target donees based on the dissemination of step (6);
(8) generating a receivable for the target donees based on the dissemination of step (6);
(9) using a collaborative giving processor (CGP), distributing the gifting target fractured amount from the primary donee to the target donees based on the dissemination of step (6) via a computerized donee transaction;
(10) generating accounting/tax reports for the primary donee based on the distribution;
(11) generating accounting/tax reports for the target donees based on the distribution; and
(12) proceeding to step (1);
wherein
the steps are performed by one or more computer systems executing software retrieved from a computer readable medium.

This general method may be modified heavily depending on a number of factors, with rearrangement and/or addition/deletion of steps anticipated by the scope of the present invention. Integration of this and other preferred exemplary embodiment methods in conjunction with a variety of preferred exemplary embodiment systems described herein is anticipated by the overall scope of the present invention.

Alternate Method Summary

A present invention alternative embodiment method anticipates a wide variety of variations in the basic theme of implementation, but can be generalized as a collaborative giving method comprising:
(1) accepting entry of identification (donor ID and primary donee ID) and donee gift information (donor contribution and donee collaborative project ID) via a data entry interface (DEI);
(2) using a collaborative giving processor (CGP), indexing the collaborative project ID in a donee database to determine the donee targets associated with the collaborative project ID;
(3) using a collaborative giving processor (CGP), processing the donor contribution to a trustee donee via a computerized donor transaction;
(4) using a collaborative giving processor (CGP), disseminating the donor contribution to the trustee donee to generate a gifting target fractured amount based on information contained within the donee database;
(5) using a collaborative giving processor (CGP), distributing the gifting target fractured amount from the trustee donee to the target donees based on the dissemination of step (4) via a computerized donee transaction; and
(6) proceeding to step (1);
wherein
the steps are performed by one or more computer systems executing software retrieved from a computer readable medium.

This general method may be modified heavily depending on a number of factors, with rearrangement and/or addition/deletion of steps anticipated by the scope of the present invention. Integration of this and other preferred exemplary embodiment methods in conjunction with a variety of preferred exemplary embodiment systems described herein is anticipated by the overall scope of the present invention.

Alternate Method Summary

A present invention alternative embodiment method anticipates a wide variety of variations in the basic theme of implementation, but can be generalized as a collaborative giving method comprising:
(1) accepting entry of identification (donor ID and primary donee ID) and donee gift information (donor contribution and donee collaborative project ID) via a data entry interface (DEI);
(2) using a collaborative giving processor (CGP), indexing the collaborative project ID in a donee database to determine the donee targets associated with the collaborative project ID;
(3) generating a receivable for a trustee donee defined in the donee database;
(4) using a collaborative giving processor (CGP), processing the donor contribution to the trustee donee via a computerized donor transaction;
(5) generating accounting/tax reports for the donor associated with the processing;
(6) using a collaborative giving processor (CGP), disseminating the donor contribution to the trustee donee to generate a gifting target fractured amount based on information contained within the donee database;
(7) generating a payable for the trustee donee to the target donees based on the dissemination of step (6);
(8) generating a receivable for the target donees based on the dissemination of step (6);
(9) using a collaborative giving processor (CGP), distributing the gifting target fractured amount from the trustee donee to the target donees based on the dissemination of step (6) via a computerized donee transaction;
(10) generating accounting/tax reports for the trustee donee based on the distribution;
(11) generating accounting/tax reports for the target donees based on the distribution; and
(12) proceeding to step (1);
wherein
the steps are performed by one or more computer systems executing software retrieved from a computer readable medium.

This general method may be modified heavily depending on a number of factors, with rearrangement and/or addition/deletion of steps anticipated by the scope of the present invention. Integration of this and other preferred exemplary embodiment methods in conjunction with a variety of preferred exemplary embodiment systems described herein is anticipated by the overall scope of the present invention.

System/Method Variations

The present invention anticipates a wide variety of variations in the basic theme of construction. The examples presented previously do not represent the entire scope of possible usages. They are meant to cite a few of the almost limitless possibilities.

This basic system and method may be augmented with a variety of ancillary embodiments, including but not limited to:

- An embodiment wherein the computerized donor transaction comprises a financial transaction selected from a group consisting of restricted account transactions, negotiable instrument transactions, check transactions, credit card transactions, debit card transactions, and ACH transactions.
- An embodiment wherein the computerized donee transaction comprises a financial transaction selected from a group consisting of restricted account transactions, negotiable instrument transactions, check transactions, credit card transactions, debit card transactions, and ACH transactions.
- An embodiment wherein the DEI is embodied in computerized hardware selected from a group consisting of a mobile phone, tablet computer, laptop computer, and desktop computer.
- An embodiment wherein the DEI and the CGP communicate over the Internet.
- An embodiment wherein the CGP generates a report of the computerized donor transaction that is sent to the DEI.
- An embodiment wherein the CGP generates a report of the computerized donor transaction that is sent to the donee associated with the donor database.
- An embodiment wherein the CGP generates a receivable to the donee associated with the donor database in the amount of the monetary gifting amount.
- An embodiment wherein the CGP generates a payable to the gifting targets in the amount of the gifting target fractured amount, wherein the payable is reported to the donee associated with the donor database.
- An embodiment wherein the CGP generates a receivable for the gifting targets in the amount of the gifting target fractured amount, wherein the receivable is reported to the gifting target associated with the gifting target fractured amount.

One skilled in the art will recognize that other embodiments are possible based on combinations of elements taught within the above invention description.

Generalized Computer Usable Medium

As generally illustrated herein, the system embodiments of the present invention can incorporate a variety of computer readable media that comprise computer usable medium having computer readable code means embodied therein. One skilled in the art will recognize that the software associated with the various processes described herein can be embodied in a wide variety of computer accessible media from which the software is loaded and activated. Pursuant to *In re Beauregard*, 35 USPQ2d 1383 (U.S. Pat. No. 5,710,578), the present invention anticipates and includes this type of computer readable media within the scope of the invention.

Conclusion

A collaborative giving system/method that coordinates the dissemination and sharing of donor gifts within a cooperating group of donee recipients has been disclosed. The system/method allows donee-specific donor databases to drive automated and spatially-distributed fundraising efforts for a collaborative project with donated funds being disseminated and shared among collaborative donees while simultaneously guaranteeing that donor anonymity is maintained with respect to each individual donee-specific donor database. This donor/donee anonymity permits large groups of potentially diverse donors to be assembled to support collaborative projects while still maintaining donor privacy and donee autonomy. Within the context of this typical gifting application the disclosed system/method provides the necessary accounting interface and reports to ensure that the internal/external accounting/tax issues associated with the disseminated gifting transaction are properly accounted for with the donor and all collaborating donees.

What is claimed is:

1. A method for a collaborative project between a primary donee and a secondary donee hosted on a collaborative giving processor, the method comprising:
   providing a graphical user interface to access the collaborative giving processor through a computer network;
   connecting to a primary donor database comprising donor information maintained by and accessible only by the primary donee;
   connecting to a donee database comprising donee information, including information of the primary donee, information of the secondary donee, and information of the collaborative project;
   transmitting a communication from the graphical user interface to a donor device selected from the primary donor database, wherein the communication solicits a donor to contribute to the collaborative project and the donor information of the primary donor database includes the donor device for a donor;
   receiving from the donor device to the collaborative giving processor, via a computer network, a donation comprising a donor ID, donor contribution amount, and a collaborative project ID; generating a computerized donor transaction for said donor contribution amount to a funding pool identified by the collaborative project ID, wherein the collaborative project corresponds to the collaborative project ID;
   the collaborative giving processor retrieving from a donee database said secondary donee associated with said collaborative project ID;
   the collaborative giving processor triggering a distribution restriction process wherein the distribution restriction process uses the donor contribution amount and predetermined fracturing logic of the collaborative project in said donee database to generate a first fractured amount to the primary donee and a second fractured amount to the secondary donee, and wherein the distribution restriction process disseminates the first fractured amount to the primary donee and the second fractured amount to the secondary donee via a computerized donee transaction.

2. The collaborative giving method of claim 1 wherein said computerized donor transaction comprises a financial transaction selected from a group consisting of restricted account transactions, negotiable instrument transactions, check transactions, credit card transactions, debit card transactions, and ACH transactions.

3. The collaborative giving method of claim 1 wherein said computerized donee transaction comprises a financial transaction selected from a group consisting of restricted account transactions, negotiable instrument transactions, check transactions, credit card transactions, debit card transactions, and ACH transactions.

4. The collaborative giving method of claim 1 wherein said donor device comprises computerized hardware selected from a group consisting of a mobile phone, tablet computer, laptop computer, and desktop computer.

5. The collaborative giving method of claim 1 wherein said donor device and said collaborative giving processor communicate over the Internet.

6. The collaborative giving method of claim 1 wherein said collaborative giving processor generates a report of said computerized donor transaction that is sent to said donor device.

7. The collaborative giving method of claim 1 wherein said collaborative giving processor generates a report of said computerized donor transaction that is sent to the primary donee associated with said primary donor database.

8. The collaborative giving method of claim 1 wherein said collaborative giving processor generates a receivable to the primary donee associated with said primary donor database in the amount of said donor contribution amount.

9. The collaborative giving method of claim 1 wherein said collaborative giving processor generates a payable to said secondary donee in the amount of said donee fractured amount, wherein said payable is reported to the primary donee associated with said primary donor database.

10. The collaborative giving method of claim 1 wherein said collaborative giving processor generates a receivable for said secondary donee in the amount of said donee fractured amount, wherein said receivable is reported to the secondary donee.

11. A method for a collaborative project hosted on a collaborative giving processor, the method comprising:
on behalf of a primary donee, transmitting an invitation to a secondary donee to participate in the collaborative project identified by a collaborative project ID;
receiving from a donor device, via a computer network, a donation comprising a donor ID, a donor contribution amount, and a collaborative project ID, wherein the donor ID identifies a donor in a donor database, wherein the donor database is accessible only to the primary donee;
the collaborative giving processor retrieving from a donee database a secondary donee associated with said collaborative project ID, wherein the donee database comprises information of the primary donee, the secondary donee, and the collaborative project;
processing said donor contribution to a funding pool via a computerized donor transaction;
the collaborative giving processor triggering a distribution restriction process wherein the distribution restriction process uses said donor contribution amount and predetermined fracturing logic of the collaborative project in said donee database to generate a first fractured amount and a second fractured amount, and wherein the distribution restriction process disseminates said first fractured amount to said primary donee frome the funding pool via a first computered donee transaction; and
the collaborative giving processor distributing said second fractured amount from said funding pool to said secondary donee via a second computerized donee transaction.

12. The collaborative giving method of claim 11 wherein said computerized donor transaction comprises a financial transaction selected from a group consisting of restricted account transactions, negotiable instrument transactions, check transactions, credit card transactions, debit card transactions, and ACH transactions.

13. The collaborative giving method of claim 11 wherein said first computerized donee transaction comprises a financial transaction selected from a group consisting of restricted account transactions, negotiable instrument transactions, check transactions, credit card transactions, debit card transactions, and ACH transactions.

14. The collaborative giving method of claim 11 wherein said donor device comprises computerized hardware selected from a group consisting of a mobile phone, tablet computer, laptop computer, and desktop computer.

15. The collaborative giving method of claim 11 wherein said donor device and said collaborative giving processor communicate over the Internet.

16. The collaborative giving method of claim 11 wherein said collaborative giving processor generates a report of said computerized donor transaction that is sent to said donor device.

17. The collaborative giving method of claim 11 wherein said collaborative giving processor generates a report of said computerized donor transaction that is sent to said primary donee associated with said donor database.

18. The collaborative giving method of claim 11 wherein said collaborative giving processor generates a receivable to said primary donee associated with said donor database in the amount of said donor contribution amount.

19. The collaborative giving method of claim 11 wherein said collaborative giving processor generates a payable to said secondary donee in the amount of said donee fractured amount, wherein said payable is reported to the primary donee associated with said donor database.

20. The collaborative giving method of claim 11 wherein said collaborative giving processor generates a receivable for said secondary donee in the amount of said donee fractured amount, wherein said receivable is reported to the secondary donee associated with said donee fractured amount.

* * * * *